United States Patent
Yang et al.

(10) Patent No.: US 11,424,686 B2
(45) Date of Patent: Aug. 23, 2022

(54) CONVERTER WITH ADJUSTED DUTY RATES CONTROLLING SWITCHES IN HALF-BRIDGE CIRCUIT

(71) Applicants: LITE-ON ELECTRONICS (GUANGZHOU) LIMITED, Guangzhou (CN); LITE-ON TECHNOLOGY CORPORATION, Taipei (TW)

(72) Inventors: En-Yong Yang, Taipei (TW); I-Hung Lamn, Taipei (TW); Yu-Jen Chen, Taipei (TW); Chin-Pin Chen, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 86 days.

(21) Appl. No.: 17/090,702

(22) Filed: Nov. 5, 2020

(65) Prior Publication Data

US 2022/0014104 A1 Jan. 13, 2022

(30) Foreign Application Priority Data

Jul. 13, 2020 (CN) .......................... 202010668378.4

(51) Int. Cl.
*H02M 3/335* (2006.01)
*H02M 1/08* (2006.01)
(Continued)

(52) U.S. Cl.
CPC ......... *H02M 3/33576* (2013.01); *H02M 1/08* (2013.01); *H02M 3/01* (2021.05); *H02M 1/0058* (2021.05); *H02M 3/33571* (2021.05)

(58) Field of Classification Search
CPC ......... H02M 3/33576; H02M 3/33571; H02M 3/01; H02M 3/3376; H02M 1/08
See application file for complete search history.

(56) References Cited

U.S. PATENT DOCUMENTS

2015/0318778 A1* 11/2015 Gong ................... H02M 3/3376
363/21.02
2015/0381060 A1* 12/2015 Eng ..................... H02M 3/3376
363/21.03

FOREIGN PATENT DOCUMENTS

TW      I596880 B    8/2017

OTHER PUBLICATIONS

Communication corresponding to Taiwan Application No. 109123546 and issued by Taiwan Intellectual Property Office dated Jul. 5, 2021, 4 pages.

* cited by examiner

*Primary Examiner* — Kyle J Moody
*Assistant Examiner* — Jye-June Lee
(74) *Attorney, Agent, or Firm* — Innovation Counsel LLP

(57) ABSTRACT

A converter with half-bridge circuit is disclosed. The converter includes a voltage source, a first switch, a second switch, a first resonant capacitor, a second resonant capacitor, a resonant inductor, a transformer and a control unit. The control unit is configured to generate a first control signal for turning on/off the first switch and a second control signal for turning on/off the second switch. When the half-bridge converter is turned on or reopened, a first duty rate of a first pulse being the first pulse of the first control signal for turning on the first switch is less than 50%, and a second duty rate of a second pulse being the first pulse of the second control signal for turning on the second switch after the end of the first pulse of the first control signal is greater than 50%.

8 Claims, 3 Drawing Sheets

(51) Int. Cl.
*H02M 3/00* (2006.01)
*H02M 1/00* (2006.01)

CONVERTER WITH ADJUSTED DUTY RATES CONTROLLING SWITCHES IN HALF-BRIDGE CIRCUIT

This application claims the benefit of People's Republic of China application Serial No. 202010668378.4, filed Jul. 13, 2020, the subject matter of which is incorporated herein by reference.

BACKGROUND OF THE INVENTION

Field of the Invention

The invention relates in general to a converter, and more particularly to a converter with half-bridge circuit.

Description of the Related Art

The half-bridge converter using LLC resonance has been widely used in power supply devices. At the instant when the conventional half-bridge converter is turned on, the conventional half-bridge converter may generate a reverse surge current, which may damage the circuit elements if the reverse surge current is too large. Therefore, it has become a prominent task for the industries to provide a converter with half-bridge circuit which avoids or inhibits the surge current generated at the instant when the converter turned on.

SUMMARY OF THE INVENTION

The present invention discloses a converter with half-bridge circuit which avoids or inhibits the surge current generated at the instant when the converter turned on.

According to one embodiment of the present invention, a converter with half-bridge circuit is disclosed. The converter with half-bridge circuit includes a primary side circuit. The primary side circuit includes a voltage source, a first switch, a second switch, a first resonant capacitor, a second resonant capacitor, a resonant inductor, a transformer and a control unit. A first end of the first switch is coupled to a first end of the voltage source. A first end of the second switch is coupled to a second end of the first switch. A second end of the second switch is coupled to a second end of the voltage source. A first end of the first resonant capacitor is coupled to a first end of the first resonant capacitor. A first end of the second resonant capacitor is coupled to a second end of the first resonant capacitor. A second end of the second resonant capacitor is coupled to the second end of the second switch. A first end of the resonant inductor is coupled to the second end of the first switch and the first end of the second switch. A first end of a primary side of the transformer is coupled to a second end of resonant inductor. A second end of the primary side of the transformer is coupled to the second end of the first resonant capacitor and the first end of the second resonant capacitor. The control unit is coupled to the first switch and the second switch to generate a first control signal for turning on/off the first switch and a second control signal for turning on/off the second switch. When the half-bridge converter is turned on or reopened, a first duty rate of a first pulse being an initial pulse of the first control signal for turning on the first switch is less than 50%, and a second duty rate of a second pulse being an initial pulse of the second control signal for turning on the second switch after the end of the first pulse of the first control signal is greater than 50%.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
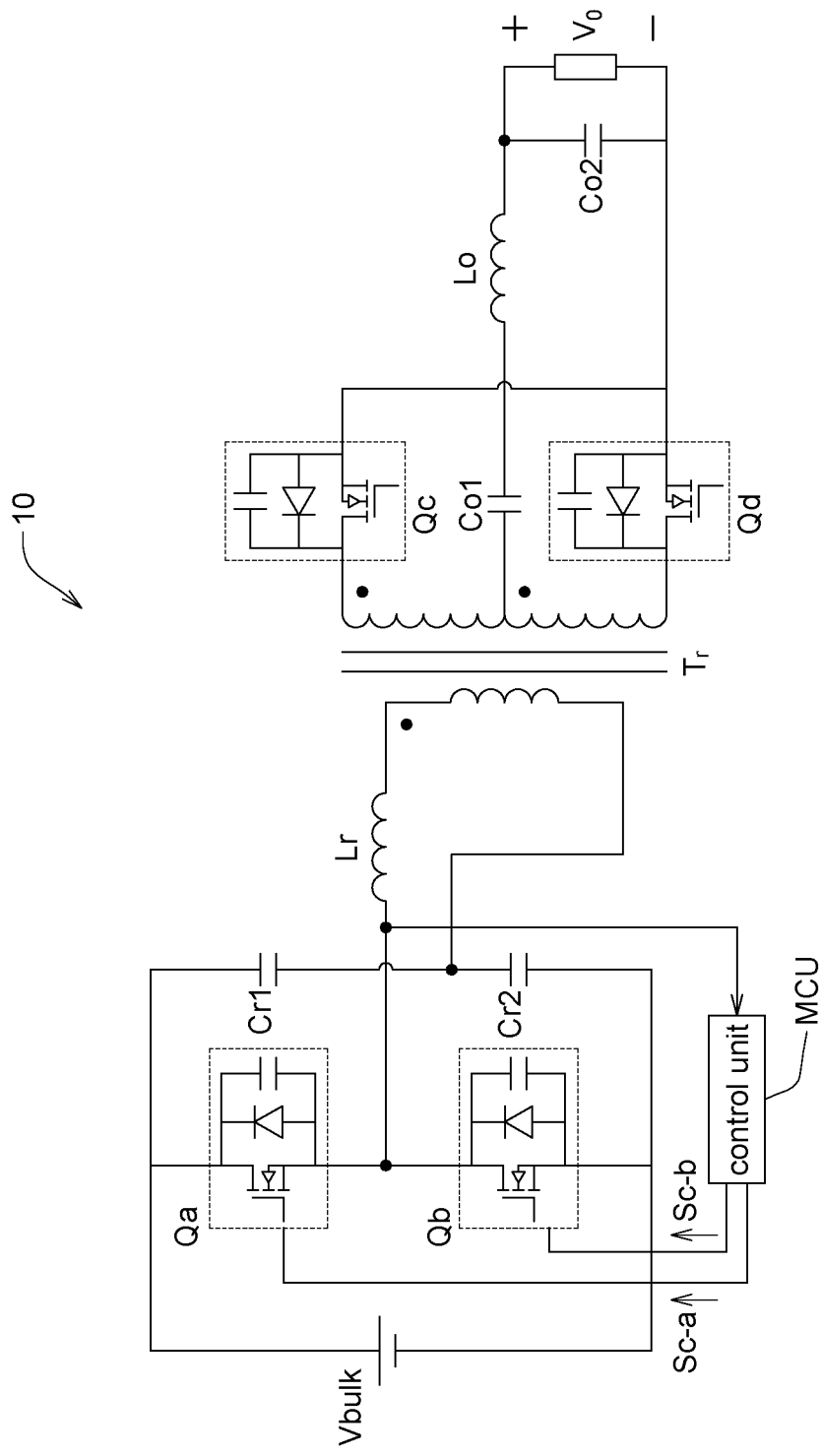
FIG. 1 is a block diagram of a converter with half-bridge circuit according to an embodiment of the present invention.

Referring to FIG. 1, a block diagram of a converter with half-bridge circuit according to an embodiment of the present invention is shown. The converter 10 includes a voltage source Vbulk, a first switch Qa, a second switch Qb, a first resonant capacitor Cr1, a second resonant capacitor Cr2, a resonant inductor Lr, a transformer Tr, a third switch Qc, a fourth switch Qd, an output inductor Lo, a first output capacitor Co1, a second output capacitor Co2 and a control unit MCU.

A first end of the first switch Qa is coupled to a first end of the voltage source Vbulk. A first end of the second switch Qb is coupled to a second end of the first switch Qa. A second end of the second switch Qb is coupled to a second end of the voltage source Vbulk. A first end of the first resonant capacitor Cr1 is coupled to the first end of the first switch Qa. A first end of the second resonant capacitor Cr2 is coupled to a second end of the first resonant capacitor Cr1. A second end of the second resonant capacitor Cr2 is coupled to the second end of the second switch Qb. A first end of the resonant inductor Lr is coupled to the second end of the first switch Qa and the first end of the second switch Qb. A first end of a primary side of the transformer Tr is coupled to a second end of the resonant inductor Lr. A second end of the primary side of the transformer Tr is coupled to the second end of the first resonant capacitor Cr1 and the second resonant capacitor Cr2. A first end of the third switch Qc is coupled to a first end of a secondary side of the transformer Tr. A first end of the fourth switch Qd is coupled to a second end of the secondary side of the transformer Tr. A second end of the fourth switch Qd is coupled to a second end of the third switch Qc. A first end of the first output capacitor Co1 is coupled to a third end of the secondary side of the transformer Tr. A first end of the output inductor Lo is coupled to a second end of the first output capacitor Co1. A first end of the second output capacitor Co2 is coupled to a second end of the output inductor Lo and is used as a first output end of the converter 10. A second end of the second output capacitor Co2 is coupled to the second end of the fourth switch Qd and is used as a second output end of the converter 10. That is, the output voltage Vo is the voltage between the first output end and the second output end.

In an embodiment, each of the first switch Qa, the second switch Qb, the third switch Qc and the fourth switch Qd can be realized by a metal oxide semiconductor field effect transistors (MOSFET) and has a parasitic diode and a parasitic capacitor.

The control unit MCU is configured to generate a first control signal Sc-a and a second control signal Sc-b. Furthermore, the control unit MCU can adjust the duty rate, frequency and dead time of a part of the pulses of the first control signal Sc-a and the second control signal Sc-b. The first switch Qa is turned on/off by the first control signal Sc-a. The second switch Qb is turned on/off by the second control signal Sc-b.

Figure 2:
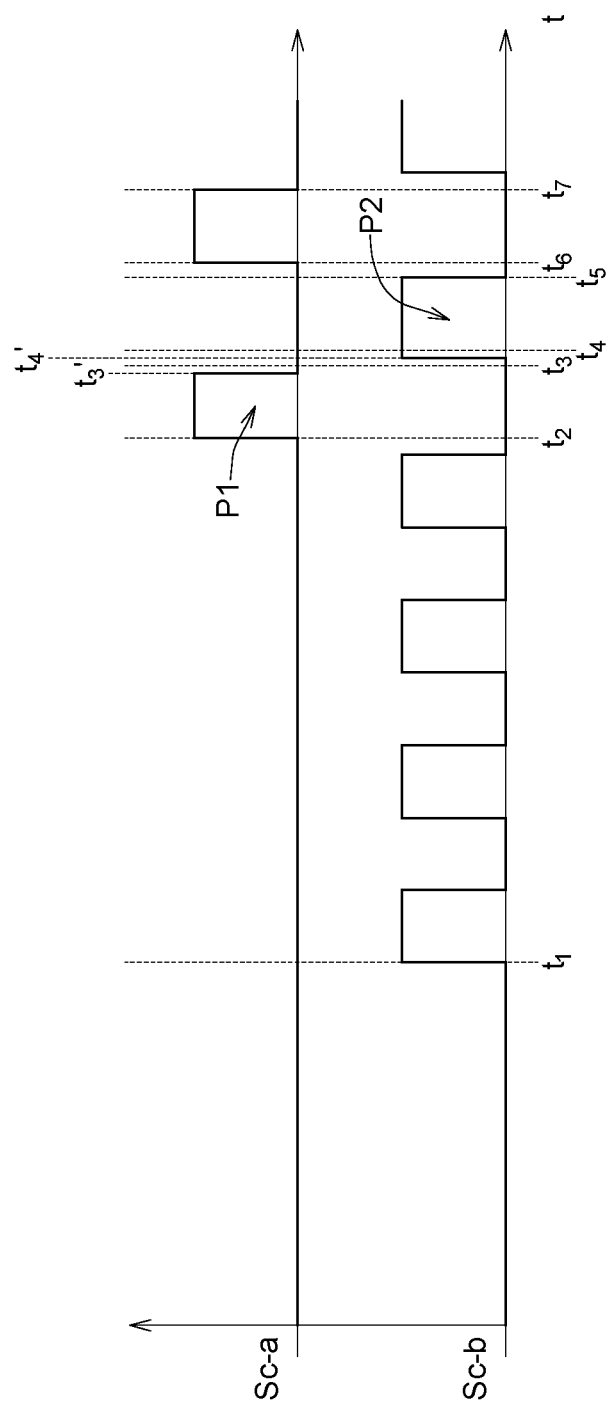
FIG. 2 is a timing diagram of a first control signal and a second control signal according to an embodiment of the present invention.

Referring to FIG. 2, a timing diagram of a first control signal for controlling a first switch and a second control signal for controlling a second switch according to an embodiment of the present invention is shown. According to the prior art, the first control signal and the second control signal are pulse width modulation signals with identical duty rate, and the control unit adjusts the signal frequency only or synchronically increases or decreases the duty rate. Details of the present invention are disclosed below.

During the t0~t1 period (that is, the preparation stage when the converter 10 is just turned on), the first switch Qa and the second switch Qb are turned off, and no matter the voltage Vcr1 of the first resonant capacitor Cr1 and the voltage Vcr2 of the second resonant capacitor Cr2 are balanced or not (no matter the voltage Vcr1 of the first resonant capacitor Cr1=the voltage Vcr2 of the second resonant capacitor Cr2), the sum of the voltage Vcr1 of the first resonant capacitor Cr1 and the voltage Vcr2 of the second resonant capacitor Cr2 is equivalent to the voltage of the voltage source Vbulk.

During the t1~t2 period, the first switch Qa is turned off, the second switch Qb is periodically turned on by the second control signal Sc-b, and the voltage source Vbulk charges the first resonant capacitor Cr1 but discharges the second resonant capacitor Cr2.

During the t2~t3' period, the first switch Qa is turned on, the second switch Qb is turned off, and the voltage source Vbulk charges the second resonant capacitor Cr2. In an embodiment, the control unit MCU, by adjusting the duty rate of the first pulse P1 of the first control signal Sc-a (that is, the duty time of pulse P1 is adjusted to t2~t3' from t2~t3) after the converter 10 is turned on or re-opened, reduces the charging time of the resonant inductor Lr, such that actual situation can be closer to the ideal state, that is, both the voltage of the first resonant capacitor Cr1 and the voltage value of the second resonant capacitor Cr2 are closer to a half of the voltage of the voltage source Vbulk at the ideal state.

During the t3'~t4' period, the first switch Qa and the second switch Qb both are turned off, the current of the resonant inductor Lr continues to flow, such that the energy of the parasitic capacitor of the second switch Qb can be released and the parasitic diode of the second switch Qb can be turned on.

During the t4'~t5 period, the first switch Qa is turned off, but the second switch Qb is turned on. In an embodiment, the control unit MCU, by adjusting the duty rate of the pulse P2 of the second control signal Sc-b of the converter 10 after the end of the first pulse P1 of the first control signal Sc-a (that is, the duty time of the pulse P2 is adjusted to t4'~t5 from t4~t5), prolongs the discharging time of the resonant inductor Lr to reduce the influence, which occurs when the voltage of the first resonant capacitor Cr1 and the voltage value of the second resonant capacitor Cr2 cannot be balanced during the t2~t3' period, and further reduces or even avoids the problem which occurs in the prior art that the converter cannot be reversed.

During the t5~t6 period, the first switch Qa and the second switch Qb both are turned off. In the prior art, since the converter cannot be reversed during the t4~t5 period, the parasitic capacitor of the first switch Qa cannot be discharged and the current will flow through the parasitic diode of the second switch Qb and continue to circulate. In the present embodiment, the control unit MCU can adjust the duty rate (or the duty time) of pulse P1 and pulse P2 to reduce or avoid the above problem which occurs when the converter cannot be reversed.

During the t6~t7 period, the first switch Qa is turned on, but the second switch Qb is turned off. In the prior art, since the voltage of the parasitic capacitor of the second switch Qb is nearly 0 and the parasitic diode of the second switch Qb is still turned on, a reverse current generated at the instant when the first switch Qa is turned on (the time point t6) will flow through the first switch Qa and the second switch Qb and continue to circulate until the parasitic capacitor of the second switch Qb is fully charged. In the present embodiment, the control unit MCU can adjust the duty rate (or the duty time) of pulse P1 and pulse P2 to inhibit the magnitude of the reverse current or avoid the generation of the reverse current.

In an embodiment, a sensing unit (not illustrated) is disposed in the resonant inductor Lr to obtain and feedback the current of the resonant inductor Lr to the control unit MCU. The control unit MCU can generate (or adjust) the first control signal Sc-a and the second control signal Sc-b according to the current of the resonant inductor Lr. Details of the mathematical derivation are disclosed below.

Firstly, the voltage of the resonant inductor Lr can be expressed as:

$$L_r * \frac{dI_{Lr(t)}}{dt} = L_r * \frac{i_{L\_max}}{\frac{1}{fs}*(1-\text{Duty})} = V_{L(t)}$$

Lr represents an inductance value of the resonant inductor; $I_{Lr}(t)$ represents a current flowing through the resonant inductor; $i_{L\_max}$ represents a current parameter; fs represents a switching frequency determined by the control unit; Duty represents a first duty rate; $V_L(t)$ represents a voltage of the resonant inductor.

The current flowing through the resonant inductor Lr can be expressed as:

$$I_{Lr(t)} = \frac{V_{L(t)} - V_{cr2(f)}}{R_{DS\_on\_Qb} + Z_{rs\_tank} + ESR_{cr2}} = \frac{\left(L_r * \frac{i_{L\_max}}{\frac{1}{fs}*(1-\text{Duty})}\right) - V_{cr2(t)}}{R_{DS\_on\_Qb} + Z_{rs\_tank} + ESR_{cr2}} = 0$$

$V_{cr2}(t)$ represents a voltage of the second resonant capacitor; $R_{DSon\_Qb}$ represents an equivalent resistance when the source and drain of the second switch are turned on; $Z_{rs\_tank}$ represents an equivalent resistance in a center-tapped direction from the second end of the first switch and the second end of the first resonant capacitor; $ESR_{cr2}$ represents an equivalent resistance of the second resonant capacitor.

The voltage of the second resonant capacitor Cr2 can be expressed as:

$$V_{cr2(t)} = L_r * \frac{i_{L\_max}}{\frac{1}{fs}*(1-\text{Duty})}$$

Therefore:

$$\text{Duty} = 1 - L_r * \frac{i_{L\_max}}{V_{cr2(f)}} * f_s$$

The first duty rate Duty of the first pulse P1 being an initial pulse of the first control signal Sc-a for turning on the first switch Qa obtained according to the above calculation is a real number less than 0.5 and greater than 0. After the design of the converter is fixed, the inductance value of the resonant inductor Lr will also be fixed, and the switching frequency fs of the first pulse P1 will remain fixed no matter the switching frequency fs changes in the second pulse P2 or not. Therefore, in actual application, the first control signal Sc-a and the second control signal Sc-b can be controlled or adjusted in a real-time manner by adjusting the duty rate of the first pulse P1 to avoid or inhibit the reverse current. The duty rate of the first pulse P1 can be obtained according to the feedback value of iL (t) or Vcr2 (t). In another application, the current parameter $i_{L\_max}$ can be determined according to the maximum allowable current value of the first switch Qa and the second switch Qb. The current parameter can be set as the product of the maximum allowable current value of the selected switch element multiplied by a coefficient greater than 0 and less than 1. That is, after the switch element (that is, the first switch Qa and the second switch Qb) and the current stress are selected, the current parameter $i_{L\_max}$ will be fixed. Once the Vcr2 (t) is fixed before the first pulse P1, for example, the capacitor of the switch element is fully charged or fully discharged, after the design of the converter 10 is set, the duty rate of the first pulse P1 can be calculated and determined to avoid or inhibit the reverse current.

In an embodiment, when the converter 10 is turned on or reopened, the control unit MCU can determine the first duty rate and the second duty rate according to the inductance value of the resonant inductor Lr, the current parameter, the voltage value of the second resonant capacitor Cr2 corresponding to the current parameter and the determined switching frequency fs through calculation and adjust the first control signal Sc-a and the second control signal Sc-b according to the first duty rate and the second duty rate.

In another embodiment, when the control unit MCU leaves the factory, the control unit MCU, based on the inductance value of the resonant inductor Lr, the current parameter and the voltage value of the second resonant capacitor Cr2 corresponding to the current parameter, can pre-determine several sets of first duty rates and second duty rates corresponding to distinct switching frequencies fs, and further store the first duty rates and the second duty rates corresponding to the distinct switching frequencies fs (or the duty time corresponding to the first duty rate and the duty time corresponding to the second duty rate) in a memory of the control unit MCU in the form of a switching frequency vs switching frequency fs cross-reference list of the first duty rate and the second duty rate (or the duty time corresponding to the first duty rate and the duty time corresponding to the second duty rate). When the converter 10 is turned on or reopened, the control unit MCU, by looking up the cross-reference list according to the determined switching frequency, selects the corresponding first duty rate and the corresponding second duty rate (or the duty time corresponding to the first duty rate and the duty time corresponding to the second duty rate) to adjust the first control signal Sc-a and the second control signal Sc-b.

In an alternate embodiment, the control unit MCU pre-determines an upper limit of the current of the resonant inductor Lr and obtains the current value of the resonant inductor Lr using an inductance sensing element, and further uses the obtained current value as a current parameter. When the difference between the current parameter and the upper limit of the current is less than a threshold, the control unit MCU calculates the first duty rate and the second duty rate in a real-time manner according to the inductance value of the resonant inductor Lr, the current parameter, the voltage value of the second resonant capacitor Cr2 corresponding to the current parameter and the current switching frequency, and adjusts the first control signal Sc-a and the second control signal Sc-b according to the first duty rate and the second duty rate. The control unit MCU detects the current value of the resonant inductor Lr and determines whether to turn off the first switch Qa according to the detected current value of the resonant inductor Lr and the pre-determined upper limit of the current.

It should be noted that in the equation for calculating the first duty rate, since both the inductance value of the resonant inductor Lr and the switching frequency fs determined by the control unit MCU are known, the voltage value of the second resonant capacitor Cr2 and the current value of the resonant inductor Lr are two major variables. The voltage value of the second resonant capacitor Cr2 and the current value of the resonant inductor Lr are correlated with each other. Given that the circuit structure of the converter 10 is known, the voltage value of the second resonant capacitor Cr2 corresponding to a specific current parameter can be calculated if the value of the specific current parameter is given. If the second resonant capacitor Cr2 is fully discharged and the cross voltage of the resonant inductor Lr is equivalent to the voltage of the first resonant capacitor Cr1 fully charged by the voltage source Vbulk, the first duty rate and the second duty rate can be determined according to the expected current parameter $i_{L\_max}$.

Refer to FIG. 2 again. The control unit MCU can obtain the first duty rate according to the above calculation to adjust the duty rate of the first pulse P1 of the first control signal Sc-a. That is, when the converter 10 is turned on or reopened, the first duty rate of the first pulse P1 being an initial pulse of the first control signal Sc-a for turning on the first switch Qa will be adjusted to be less than 50%. Moreover, a second duty rate of a second pulse P2 being an initial pulse of the second control signal Sc-b for turning on the second switch Qb after the end of the first pulse P1 of the first control signal Sc-a will be adjusted to be greater than 50%. In an embodiment, the sum of the first duty rate and the second duty rate is 100%. That is, the adjustment amount of the first duty rate can be identical to the adjustment amount of the second duty rate.

It should be noted that the duty time corresponding to the first duty rate can be calculated according to the first duty rate and the switching frequency fs. To put it in greater details, the duty time of the first pulse P1 being an initial pulse of the first control signal Sc-a for turning on the first switch Qa can be obtained by multiplying the first duty rate by the reciprocal of the switching frequency fs. Similarly, the duty time of the second pulse P2 being an initial pulse of the second control signal Sc-b for turning on the second switch Qb can be obtained by multiplying the second duty rate by the reciprocal of the switching frequency fs.

In an embodiment, the control unit MCU can adjust only the duty rate of the first pulse P1 and the second pulse P2 but does not change the duty rates of other pulses of the first control signal and the second control signal. That is, the pulses other than the first pulse P1 of the first control signal pulse can have a third duty rate different from the first duty rate, and the pulses other than the second pulse P2 of the second control signal can have a fourth duty rate different from the second duty rate. The third duty rate and the fourth duty rate both can be such as 50%.

Figure 3:
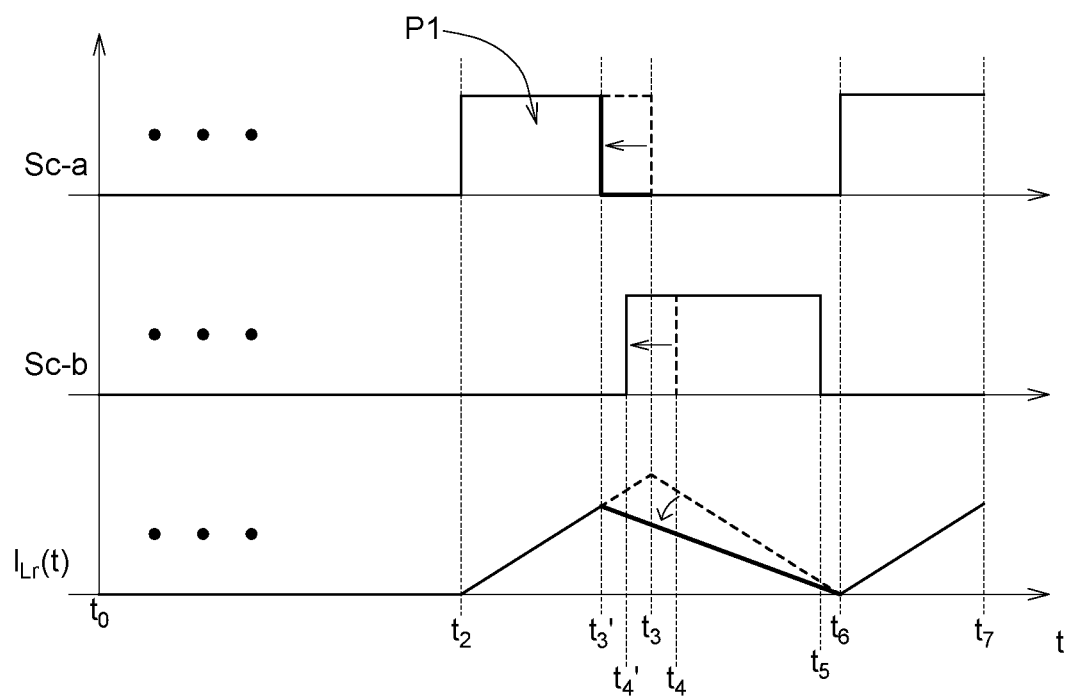
FIG. 3 is a diagram of a first control signal and the current of a resonant inductor according to an embodiment of the present invention.

Referring to FIG. 3, a diagram of a first control signal and the current of a resonant inductor according to an embodiment of the present invention is shown. when the first duty rate of the first pulse P1 being an initial pulse of the first control signal Sc-a for turning on the first switch Qa drops, the rising slope of the current of the resonant inductor Lr remains unchanged but the charging time is reduced. On the other hand, after the end of the first control signal Sc-a, the second duty rate of the second pulse P2 being an initial pulse of the second control signal Sc-b for turning on the second switch Qb increases, such that the discharging time of the resonant inductor Lr is prolonged. Through the above adjustment, the converter 10 can be reversed during the t5~t6 period and will not generate any reverse current during the t6~t7 period. Thus, despite the control unit MCU cannot reverse the converter 10 during the t5~t6 period using the reduced first duty rate, the control unit MCU still can reduce the magnitude of the reverse current generated during the t6~t7 period.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A converter with half-bridge circuit, comprising:
   a primary side circuit, comprising:
      a voltage source;
      a first switch, wherein a first end of the first switch is coupled to a first end of the voltage source;
      a second switch, wherein a first end of the second switch is coupled to a second end of the first switch and a second end of the second switch is coupled to a second end of the voltage source;
      a first resonant capacitor, wherein a first end of the first resonant capacitor is coupled to the first end of the first switch;
      a second resonant capacitor, wherein a first end of the second resonant capacitor is coupled to a second end of the first resonant capacitor and a second end of the second resonant capacitor is coupled to the second end of the second switch;
      a resonant inductor, wherein a first end of the resonant inductor is coupled to the second end of the first switch and the first end of the second switch;
      a transformer, wherein a first end of a primary side of the transformer is coupled to a second end of the resonant inductor and a second end of the primary side of the transformer is coupled to the second end of the first resonant capacitor and the first end of the second resonant capacitor; and
      a control unit coupled to the first switch and the second switch to generate a first control signal for turning on or turning off the first switch and a second control signal for turning on or turning off the second switch,
   wherein when the converter is turned on or reopened, a first duty rate of a first pulse being an initial pulse of the first control signal for turning on the first switch is less than 50%, and a second duty rate of a second pulse being an initial pulse of the second control signal for turning on the second switch after the end of the first pulse of the first control signal is greater than 50%, and the first duty rate and the second duty rate are determined according to an inductance value of the resonant inductor, a current parameter correlated with a maximum allowable current value of the first switch and the second switch, a voltage value of the second resonant capacitor and a switching frequency determined by the control unit.

2. The converter with half-bridge circuit according to claim 1, wherein the sum of the first duty rate and the second duty rate is 100%.

3. The converter with half-bridge circuit according to claim 1, wherein the current parameter is obtained by multiplying the maximum allowable current value of the first switch and the second switch by a coefficient, which is a real number greater than 0 and less than 1.

4. The converter with half-bridge circuit according to claim 1, wherein the control unit stores a cross-reference list, which records a plurality of sets of first duty rates and second duty rates corresponding to a plurality of distinct switching frequencies; when the converter is turned on or reopened, the control unit selects the corresponding first duty rate and the corresponding second duty rate according to the switching frequency determined by the control unit and the cross-reference list.

5. The converter with half-bridge circuit according to claim 1, wherein the control unit obtains a current value of the resonant inductor by an inductance sensing element, and the control unit determines the first duty rate and the second duty rate according to the current value of the resonant inductor and an allowable upper limit of the current of the resonant inductor.

6. The converter with half-bridge circuit according to claim 1, wherein the control unit stores a cross-reference list, which records a duty time corresponding to the first duty rate and a duty time corresponding to the second duty rate; the duty time corresponding to the first duty rate and the duty time corresponding to the second duty rate are determined according to an inductance value of the resonant inductor, a current parameter correlated with a maximum allowable current value of the first switch and the second switch and a voltage value of the second resonant capacitor corresponding to the current parameter.

7. The converter with half-bridge circuit according to claim 6, wherein the current parameter is obtained by multiplying the maximum allowable current value of the first switch and the second switch by a coefficient, which is a real number greater than 0 and less than 1.

8. The converter with half-bridge circuit according to claim 7, wherein a plurality of pulses other than the first pulse of the first control signal have a third duty rate different from the first duty rate, and a plurality of pulses other than the second pulse of the second control signal have a fourth duty rate different from the second duty rate.

* * * * *